United States Patent
Fujioka et al.

(10) Patent No.: US 10,256,058 B2
(45) Date of Patent: Apr. 9, 2019

(54) SWITCHGEAR

(71) Applicant: Mitsubishi Electric Corporation, Chiyoda-ku, Tokyo (JP)

(72) Inventors: Masahiro Fujioka, Tokyo (JP); Hitoshi Sadakuni, Tokyo (JP); Masato Kawahigashi, Tokyo (JP); Shinichiro Nakauchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/753,483

(22) PCT Filed: Nov. 16, 2015

(86) PCT No.: PCT/JP2015/082119
§ 371 (c)(1),
(2) Date: Feb. 19, 2018

(87) PCT Pub. No.: WO2017/085764
PCT Pub. Date: May 26, 2017

(65) Prior Publication Data
US 2018/0247778 A1    Aug. 30, 2018

(51) Int. Cl.
*H01H 33/02* (2006.01)
*H01H 33/04* (2006.01)
(Continued)

(52) U.S. Cl.
CPC .......... *H01H 33/045* (2013.01); *H01H 33/02* (2013.01); *H01H 33/06* (2013.01);
(Continued)

(58) Field of Classification Search
CPC ...... H01H 33/045; H01H 33/02; H01H 33/06; H01H 33/123; H01H 33/12; H01H 33/64;
(Continued)

(56) References Cited

U.S. PATENT DOCUMENTS 4,445,014 A * 4/1984 Gruner ................... H01H 33/12
218/12
4,500,762 A * 2/1985 Yoshizumi ............. H01H 33/24
218/12
(Continued)

FOREIGN PATENT DOCUMENTS

JP      S-57-132620 A    8/1982
JP      S-57-157415 A    9/1982
(Continued)

OTHER PUBLICATIONS

International Search Report (PCT/ISA/210) dated Feb. 9, 2016, by the Japanese Patent Office as the International Searching Authority for International Application No. PCT/JP2015/082119.
(Continued)

*Primary Examiner* — Edwin A. Leon
*Assistant Examiner* — William A Bolton
(74) *Attorney, Agent, or Firm* — Buchanan Ingersoll & Rooney PC

(57) ABSTRACT

A switchgear includes a first contact capable of reciprocating along a motion axis, and a second contact. The second contact includes a facing unit movable in a first direction from the first contact toward the second contact when the facing unit is pushed in by the first contact, a spaced unit spaced from the axis and urged in a direction toward the axis, and a regulating unit coupled to the facing unit. The spaced unit abuts on the regulating unit to restrict movement of the spaced unit in the direction toward the axis as the facing unit is located in the second direction. The spaced unit is released from abutment on the regulating unit to move in the direction toward the axis into abutment on the first contact as the facing unit moves in the first direction.

4 Claims, 20 Drawing Sheets

(51) Int. Cl.
  *H01H 33/06*   (2006.01)
  *H01H 33/12*   (2006.01)
  *H01H 33/64*   (2006.01)
  *H02B 13/075*  (2006.01)

(52) U.S. Cl.
  CPC .......... *H01H 33/123* (2013.01); *H01H 33/64* (2013.01); *H01H 2235/02* (2013.01); *H02B 13/075* (2013.01)

(58) Field of Classification Search
  CPC ...... H01H 33/78; H01H 31/16; H02B 13/075; H02B 13/035; H02B 13/045
  USPC ...... 218/146, 13, 12, 16, 37, 55, 56, 67, 68, 218/79, 80, 100
  See application file for complete search history.

(56) References Cited

U.S. PATENT DOCUMENTS 5,237,137 A * 8/1993 Lorenz ................. H01H 33/122
                                                218/14
2009/0045170 A1    2/2009  Shimizu et al.
2009/0166168 A1    7/2009  Nakauchi et al.
2013/0270228 A1*  10/2013  Nakada ................. H01H 33/12
                                                218/158

FOREIGN PATENT DOCUMENTS

| JP | H-03-92334 U | 9/1991 |
| JP | H-07-34536 U | 6/1995 |
| JP | 2000-311536 A | 11/2000 |
| JP | 2002-334637 A | 11/2002 |
| JP | 2007-027023 A | 2/2007 |
| JP | 2009-048789 A | 3/2009 |
| JP | 2009-163946 A | 7/2009 |

OTHER PUBLICATIONS

Written Opinion (PCT/ISA/237) dated Feb. 9, 2016, by the Japanese Patent Office as the International Searching Authority for International Application No. PCT/JP2015/082119.

* cited by examiner

SWITCHGEAR

FIELD

The present invention relates to a switchgear incorporated into a gas-insulated switching device.

BACKGROUND

Grounding switchgears are conventionally incorporated into gas-insulated switching devices to ground main circuits during inspection of the devices. As disclosed in Patent Literature 1, when the main circuit is to be grounded, a movable contact on a grounding side is moved into contact with a stationary contact disposed on a main circuit side. Before the movable contact contacts the stationary contact, the main circuit should be disconnected to thereby apply no voltage to the stationary contact.

CITATION LIST

Patent Literature

Patent Literature 1: Japanese Patent Application Laid-open No. 2009-163946

SUMMARY

Technical Problem

Some switchgear of that type is required to assure a safety closing operation even if the movable contact accidentally contacts the stationary contact as the main circuit is not disconnected but remains closed. In this case, the movable contact needs to be moved rapidly in order to suppress occurrence of arc between the movable contact and the stationary contact. Unfortunately, an operating device for rapidly moving the movable contact is large in size and a coupling mechanism that couples the operating device and the switchgear to each other needs to be strengthened, which reduces the design flexibility.

The present invention has been achieved in view of the above problems and an object of the present invention is to provide a switchgear that can lower the moving speed of a movable contact to thereby downsize the operating device and improve the design flexibility.

Solution to Problem

To solve the problems and achieve the object, the present invention provides a switchgear comprising a first contact disposed to be capable of reciprocating along a motion axis, and a second contact disposed on the motion axis. The second contact includes a facing unit made of an insulating material and facing a distal end part of the first contact, the distal end part being located in a first direction, the first direction being a direction from the first contact toward the second contact, the facing unit being disposed to be movable in the first direction when the facing unit is pushed in by the distal end part of the first contact moving in the first direction, an urging unit to urge the facing unit in a second direction, the second direction being a direction opposite to the first direction, a spaced unit spaced from the motion axis and urged in a direction toward the motion axis, and a regulating unit coupled to the facing unit. The spaced unit abuts on the regulating unit to regulate movement of the spaced unit in the direction toward the motion axis as the facing unit is located in the second direction under action of an urging force of the urging unit. The spaced unit is released from abutment on the regulating unit to remove the regulation of the movement of the spaced unit in the direction toward the motion axis as the facing unit is pushed in by the distal end part of the first contact to move in the first direction. The spaced unit is disposed without abutting on the first contact that reciprocates, as the regulating unit regulates the movement of the spaced unit in the direction toward the motion axis, and the spaced unit moves in the direction toward the motion axis into abutment on the first contact as the regulation by the regulating unit is removed.

Advantageous Effects of Invention

The switchgear according to the present invention provides an effect of lowering the moving speed of the movable contact to thereby downsize the device and improve the design flexibility.

DESCRIPTION OF EMBODIMENTS

Switchgears according to embodiments of the present invention will be described in detail below with reference to the accompanying drawings. The present invention is not limited to the embodiments.

First Embodiment.

Figure 1:
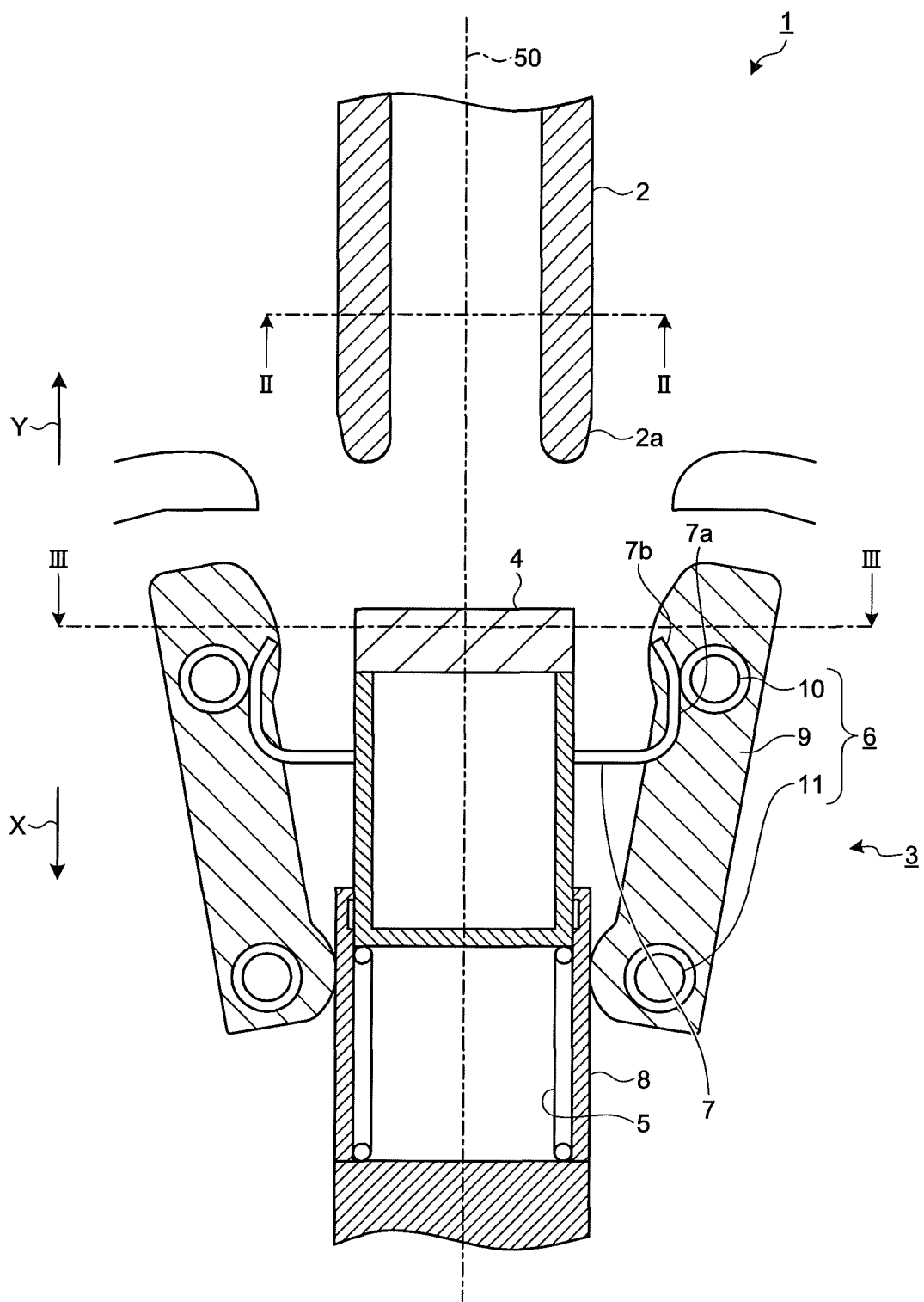
FIG. 1 is a sectional view illustrating a schematic configuration of a switchgear according to a first embodiment of the present invention.
Figure 2:
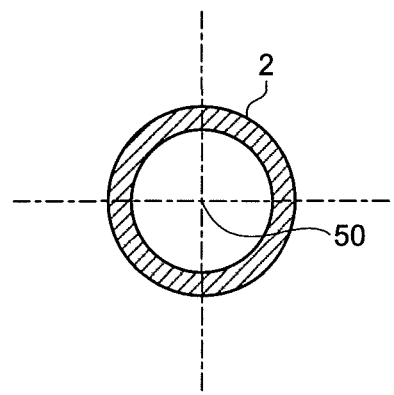
FIG. 2 is a sectional view as viewed in an arrow direction along a line II-II illustrated in FIG. 1.
Figure 3:
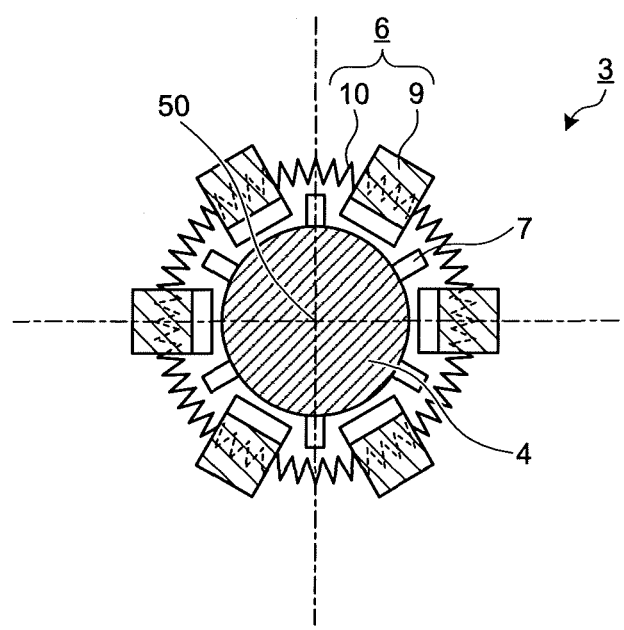
FIG. 3 is a sectional view as viewed in an arrow direction along a line illustrated in FIG. 1.

FIG. 1 is a sectional view illustrating a schematic configuration of a switchgear according to a first embodiment of the present invention. FIG. 2 is a sectional view taken along line II-II illustrated in FIG. 1. FIG. 3 is a sectional view taken along line III-III illustrated in FIG. 1.

A switchgear 1, which is a grounding switchgear, is disposed for use in a tank (not illustrated) filled with electrically-insulating and arc-extinguishing insulating gas such as sulfur hexafluoride ($SF_6$) gas. The switchgear 1 includes a movable contact 2 that is a first contact, and a stationary contact 3 that is a second contact.

The movable contact 2 and the stationary contact 3 are disposed on the same motion axis 50. The following descriptions are made assuming that a direction parallel to the motion axis 50 from the movable contact 2 toward the stationary contact 3 is indicated by an arrow X as a first direction while a direction parallel to the motion axis from the stationary contact 3 toward the movable contact 2 is indicated by an arrow Y as a second direction.

The movable contact 2 is disposed to be capable of reciprocating along the motion axis 50. As illustrated in FIG. 2, the movable contact 2 has a cylindrical shape having a center axis defined by the motion axis 50. The movable contact 2 is a grounded contact. Movement of the movable contact 2 in the direction indicated by the arrow X causes a distal end part 2a located in the direction indicated by the arrow X to abut on a facing unit 4 of the stationary contact 3, as will be described later, and then push in the facing unit 4 in the direction indicated by the arrow X.

The stationary contact 3 includes the facing unit 4, a first urging unit 5, spaced units 6, and regulating units 7. The facing unit 4, which is located on the motion axis 50 away from the movable contact 2 in the direction indicated by the arrow X, faces the distal end part 2a of the movable contact 2. The facing unit 4 has an end part located in the direction indicated by the arrow Y. That is, this end part faces the distal end part 2a of the movable contact 2, and is made of an insulating material. The facing unit 4 is inserted into a tubular guide unit 8 and is capable of reciprocating along the motion axis 50.

The first urging unit 5 is a spring disposed inside the guide unit 8 and urges the facing unit 4 in the direction indicated by the arrow Y. Although not illustrated, the facing unit 4 is structured to be caught on an inner wall of the guide unit 8 so as not to completely come out of the guide unit 8 in the direction indicated by the arrow Y. The facing unit 4 is pushed in by the distal end part 2a of the movable contact 2 to move in the direction indicated by the arrow X when the movable contact 2 moves in the direction indicated by the arrow X. When the movable contact 2 moves in the direction indicated by the arrow Y, the facing unit 4, which has been pushed in by the distal end part 2a, moves in the direction indicated by the arrow Y under the action of an urging force of the first urging unit 5.

The spaced unit 6 includes a plurality of contact motion units 9 arranged on a circumference centering the motion axis 50, a second urging unit 10 that urges the contact motion units 9 in a direction toward the motion axis 50, and a fixing unit 11 that fixes the contact motion units 9 to the guide unit 8, as illustrated in FIG. 3. This arrangement allows the contact motion units 9 to be spaced from the motion axis 50. The second urging unit 10 and the fixing unit 11 are annular springs. The fixing unit 11 surrounds the guide unit 8 and fixedly pushes the contact motion units 9 against the guide unit 8. The second urging unit 10, which is disposed away from the fixing unit 11 in the direction indicated by the arrow Y, more specifically, away from the guide unit 8 in the direction indicated by the arrow Y, urges the contact motion units 9 in the direction toward the motion axis 50.

Each regulating unit 7 is a member coupled to the facing unit 4 and can be formed integrally with the facing unit 4 or can be distinct from the facing unit 4 and fixed to the facing unit 4. The regulating unit 7 protrudes from a lateral side surface of the facing unit 4, and then is bent in the direction indicated by the arrow Y.

The regulating unit 7 has an abutting face 7a formed thereon, which abuts on the contact motion unit 9 or the second urging unit 10, that is, the spaced unit 6 from the side of the motion axis 50 as the facing unit 4 is located in the direction indicated by the arrow Y under the action of the urging force of the first urging unit 5. The present embodiment provides an example in which the regulating unit 7 abuts on the second urging unit 10 of the spaced unit 6. The abutting face 7a, which is formed away from the bent of the regulating unit 7 toward a distal end of the regulating unit 7, faces the spaced unit 6. The abutting face 7a includes an approaching face 7b that approaches the motion axis 50 as the approaching face extends in the direction indicated by the arrow Y.

The abutment of the abutting face 7a of the regulating unit 7 on the second urging unit 10 allows the contact motion unit 9 to be spaced from the motion axis 50 and restricted in moving in the direction toward the motion axis 50. The contact motion units 9, which are spaced from the motion axis 50 by the regulating unit 7, are disposed without abutting on the movable contact 2 that reciprocates along the motion axis 50. When the facing unit 4 is pushed in by the distal end part 2a of the movable contact 2 to move in the direction indicated by the arrow X, the second urging unit 10 is released from the abutment on the regulating unit 7, such that the restriction in movement of the contact motion unit 9 in the direction toward the motion axis 50 is removed, as will be described in detail later.

The guide unit 8 of the stationary contact 3 is connected to a bus that provides a main circuit (not illustrated). The guide unit 8 and the contact motion units 9 have their surfaces plated with silver. The movable contact 2 has its surface plated with silver, too.

Figure 4:
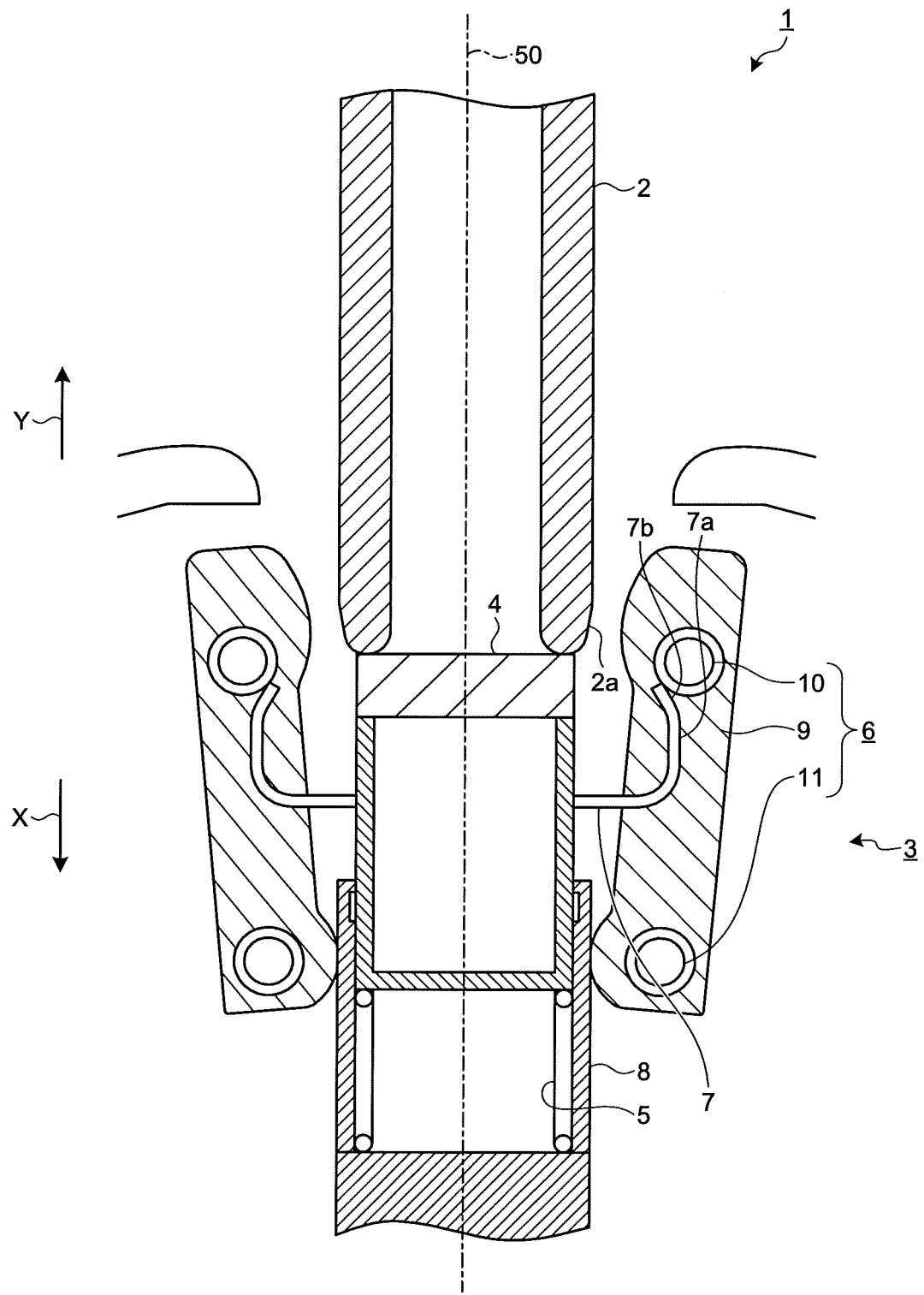
FIG. 4 is a sectional view for explaining a grounding operation of the switchgear according to the first embodiment.
Figure 5:
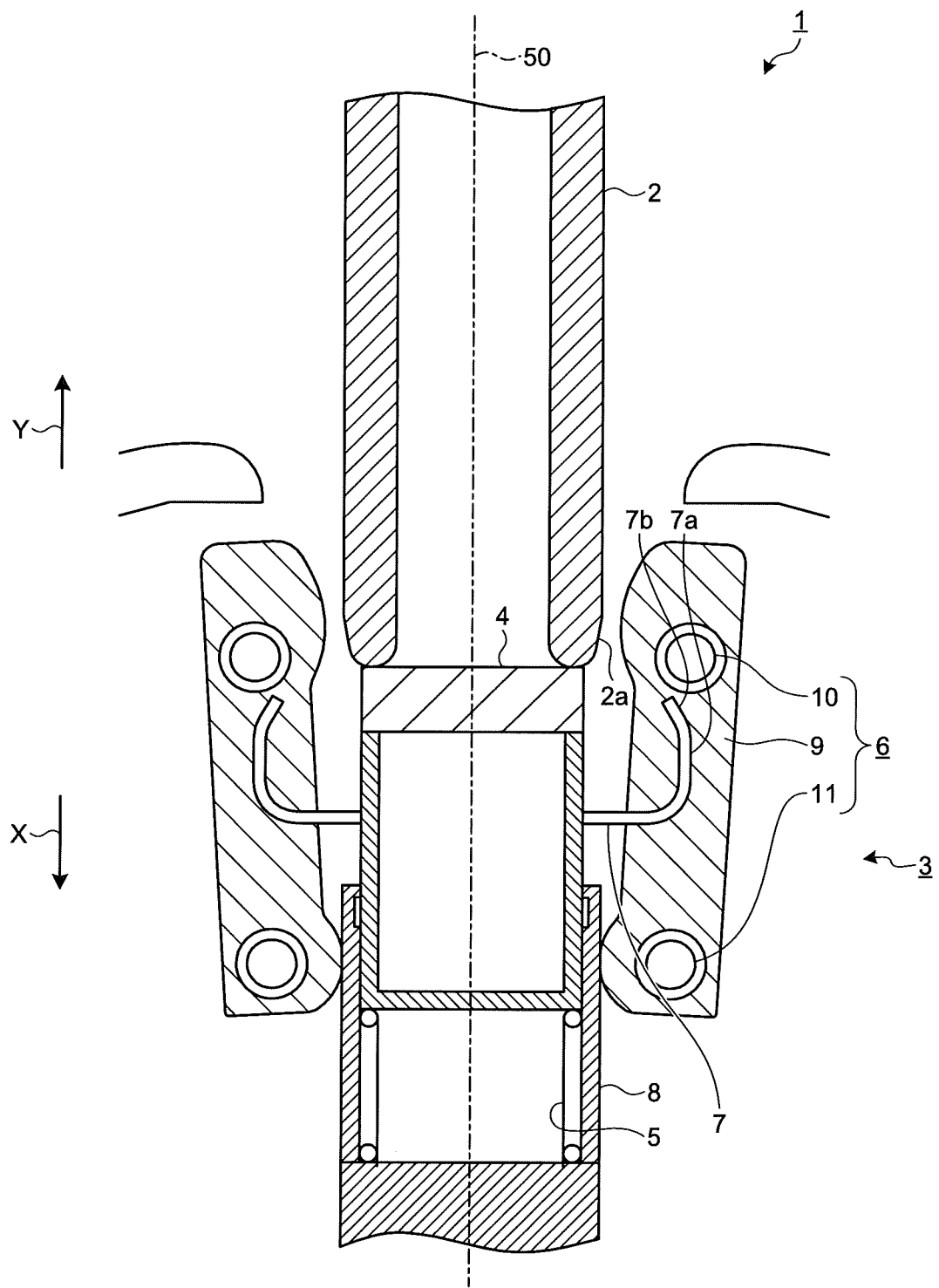
FIG. 5 is a sectional view for explaining a grounding operation of the switchgear according to the first embodiment.
Figure 6:
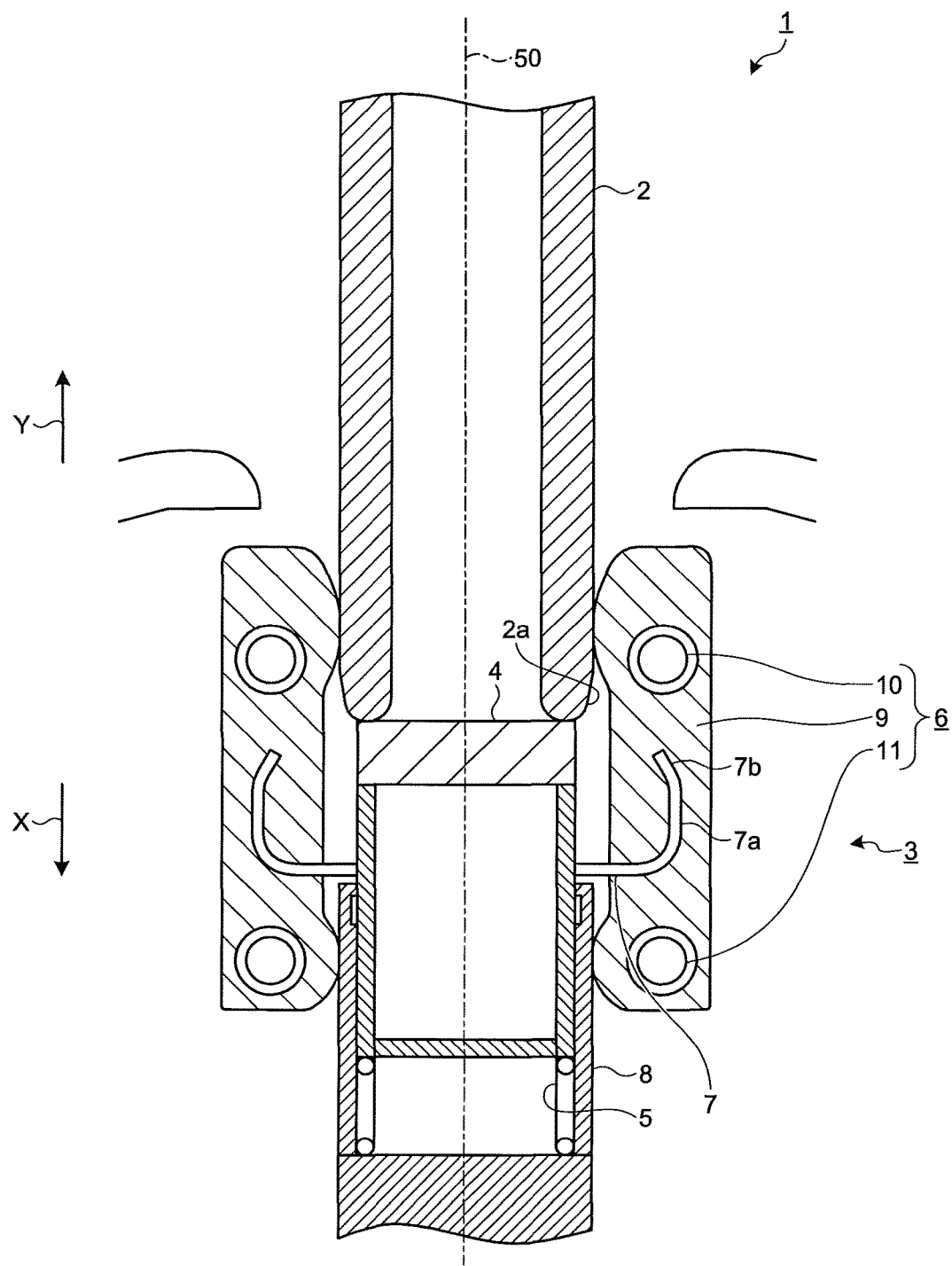
FIG. 6 is a sectional view for explaining a grounding operation of the switchgear according to the first embodiment.
Figure 7:
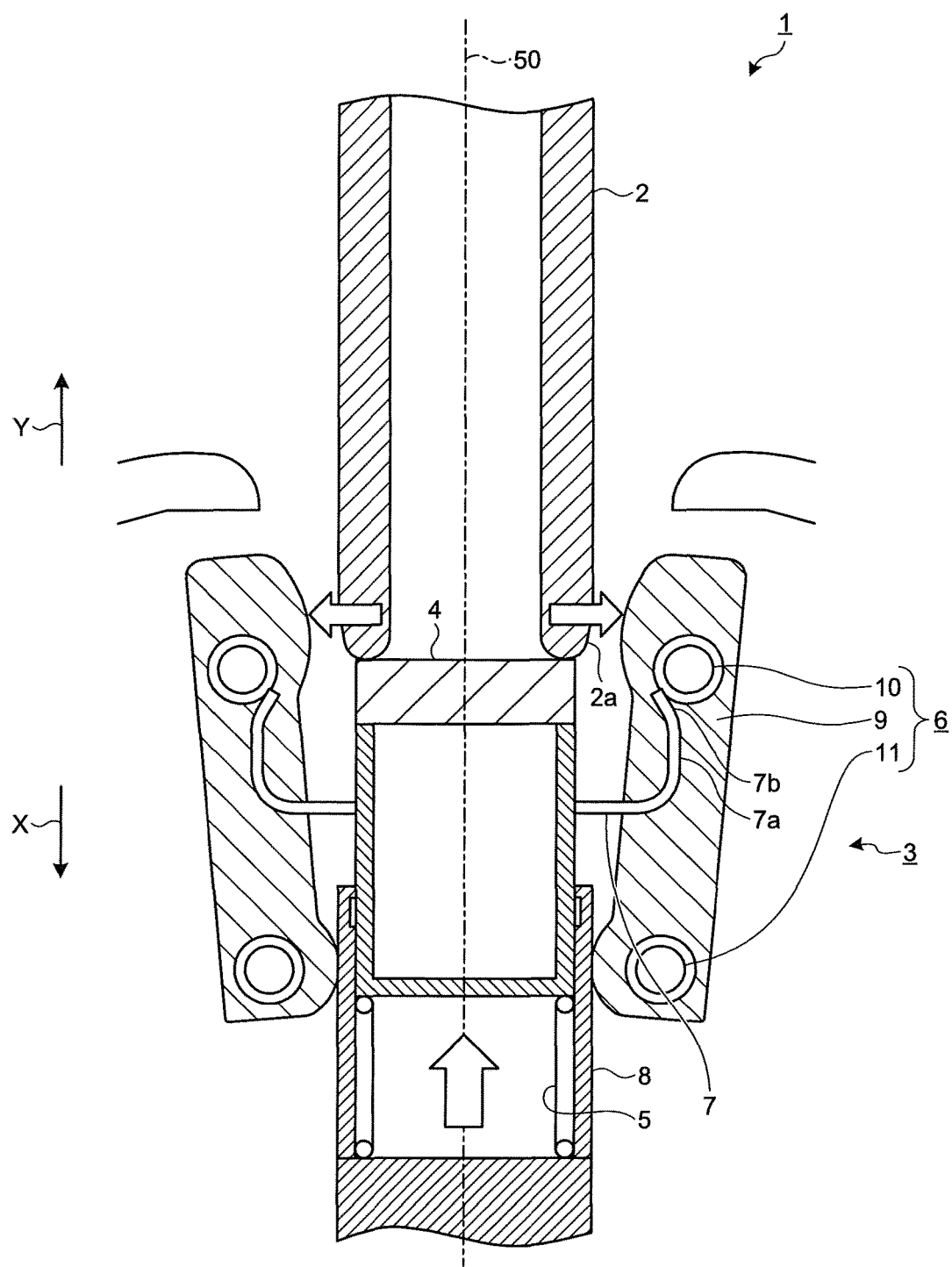
FIG. 7 is a sectional view for explaining a recovery operation of the switchgear according to the first embodiment.
Figure 8:
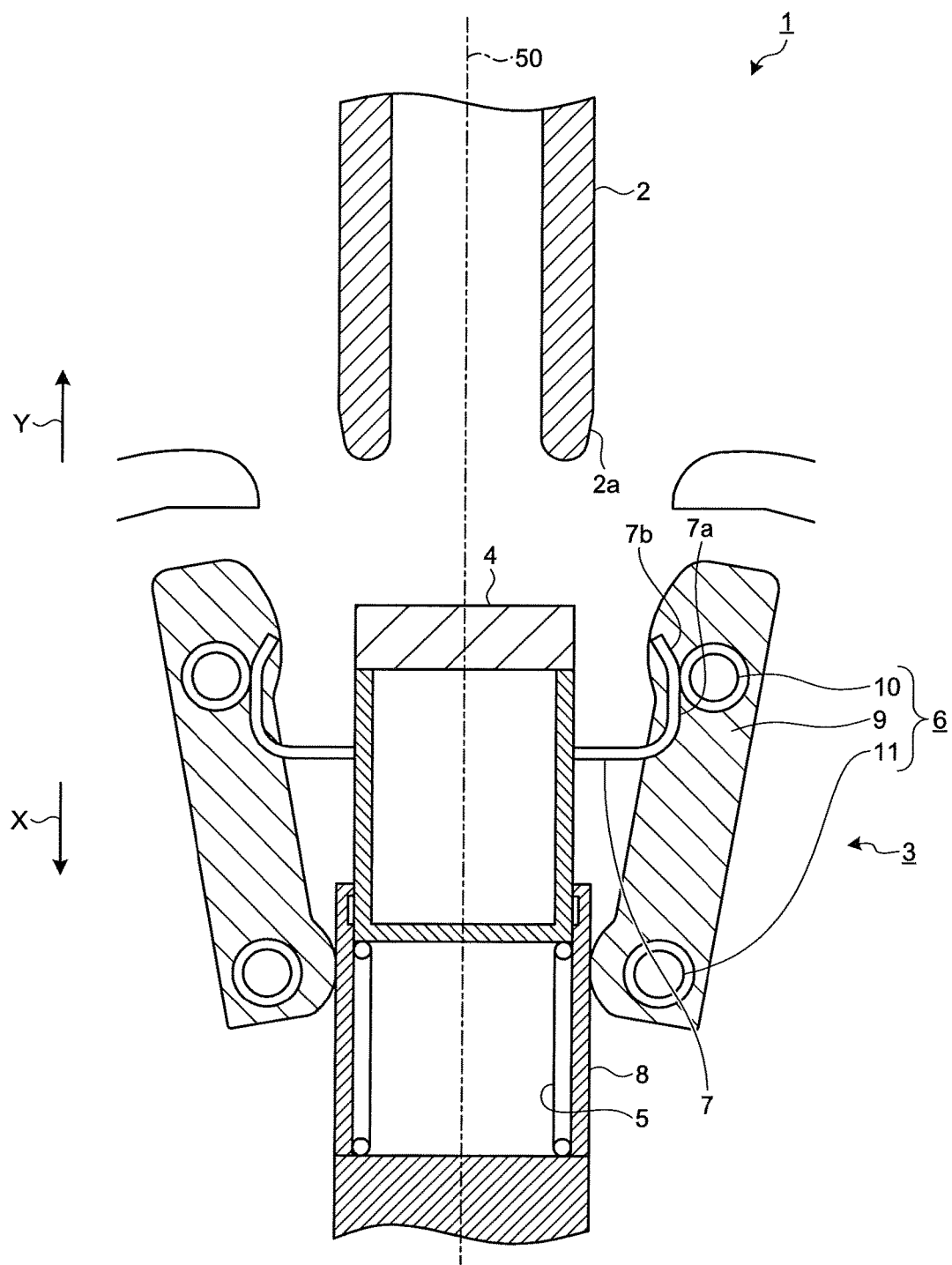
FIG. 8 is a sectional view for explaining a recovery operation of the switchgear according to the first embodiment.

A description is made below as to both a grounding and recovery operations of the switchgear 1. The grounding operation is an operation of bringing the movable contact 2 into contact with the stationary contact 3, such that the bus connected to the movable contact 2 is grounded. The recovery operation is an operation of separating the movable contact 2 and the stationary contact 3 from each other, such that the bus comes out of the grounded state. FIGS. 4 to 6 are sectional views for explaining the grounding operation of the switchgear 1 according to the first embodiment. FIGS. 7 and 8 are sectional views for explaining the recovery operation of the switchgear 1 according to the first embodiment.

First, the movable contact 2 is separated from the stationary contact 3 before the grounding operation is performed, as illustrated in FIG. 1. Next, when the grounding operation is started, the movable contact 2 moves in the direction indicated by the arrow X to thereby bring the distal end part 2a into contact with the facing unit 4, as illustrated in FIG. 4. Subsequently, when the movable contact 2 further moves in the direction indicated by the arrow X to move the facing unit 4 in the direction indicated by the arrow X against the urging force of the first urging unit 5, such that the regulating units 7 coupled to the facing unit 4 also move in the direction indicated by the arrow X, as illustrated in FIG. 5.

When the movable contact 2 further moves in the direction indicated by the arrow X, the second urging unit 10 is released from the abutment on the abutting faces 7a of the regulating units 7 to thereby allow the contact motion units 9 to move in the direction toward the motion axis 50, as illustrated in FIG. 6. This brings the contact motion units 9 into abutment on an outer peripheral surface of the movable contact 2, as illustrated in FIG. 6, thereby completing the grounding operation. The bus becomes grounded through the guide unit 8, the contact motion units 9, and the movable contact 2.

Next, in the recovery operation, the movable contact 2 is moved in the direction indicated by the arrow Y, whereby the facing unit 4 and the regulating units 7 move in the direction indicated by the arrow Y under the action of the urging force of the first urging unit 5, as illustrated in FIG. 7. At that time, the distal ends of the approaching faces 7b of the regulating units 7 move into a space between the motion axis 50 and the second urging unit 10. The movable contact 2 then further moves in the direction indicated by the arrow Y, whereby the facing unit 4 and the regulating units 7 also move in the direction indicated by the arrow Y, as illustrated in FIG. 8. At that time, the abutting faces 7a of the regulating units 7 move the contact motion units 9 in the direction away from the motion axis 50, such that the switchgear 1 completes the recovery into the state that precedes the start of the grounding operation.

Typically, the grounding operation of the switchgear 1 that is a grounding switchgear is performed with the bus disconnected, i.e., with no voltage applied to the stationary contact 3. However, even if the grounding operation is performed with the bus closed to apply a voltage to the stationary contact 3, it is necessary to assure the durability and reliability of the product by suppressing occurrence of arc between the movable contact 2 and the stationary contact 3. A grounding operation performed with the bus closed to apply a voltage to the stationary contact 3 is hereinafter simply referred to as an "erroneous closing operation".

In order to suppress the occurrence of arc at the time of the erroneous closing operation, the movable contact 2 and the stationary contact 3 need to rapidly come into contact with each other. The occurrence of arc is hitherto suppressed by rapidly moving the movable contact 2. Unfortunately, in some case, the operating device for rapidly moving the movable contact 2 is large-sized and the design flexibility is lowered.

In contrast, in the present embodiment, since the insulating-material-made part of the facing unit 4 faces the distal end part 2a of the movable contact 2, the occurrence of arc between the movable contact 2 and the facing unit 4 is suppressed. Furthermore, even if the movable contact 2 is moved slowly, the occurrence of arc can be suppressed provided that the contact motion units 9 remain so distant from the movable contact 2 that no arc occurs until the second urging unit 10 is released from the abutment on the regulating units 7, as illustrated in FIG. 4.

Further, when the second urging unit 10 is released from the abutment on the regulating units 7, the contact motion units 9 move toward the movable contact 2 under the action of the urging force of the second urging unit 10. The urging force of the second urging unit 10 is set to cause the contact motion units 9 to move toward the motion axis 50 at a speed that suppresses the occurrence of arc between the contact motion units 9 and the movable contact 2. It is therefore possible to suppress the occurrence of arc at the time of the erroneous closing operation.

In the present embodiment, the contact motion units 9 of the stationary contact 3 undergo the high-speed motion that suppresses the occurrence of arc, as discussed above. As a result, the moving speed of the movable contact 2 can be lowered. This can achieve the simplification and downsizing of the operating device for moving the movable contact 2 and the improvement of the design flexibility.

Since the urging force that causes the contact motion units 9 to undergo the high-speed motion can be applied using a simple configuration such as an annular spring used as the second urging unit 10, the configuration of the device can be further simplified.

Although the present embodiment provides an example in which the second contact including the facing unit 4, the spaced unit 6, and the regulating units 7 is the stationary contact 3, the facing unit 4, the spaced unit 6, and the regulating units 7 may be provided on the movable contact 2 rather than on the stationary contact 3, and the movable contact 2 may function as the second contact and the stationary contact 3 may function as the first contact.

Second Embodiment.

Figure 9:
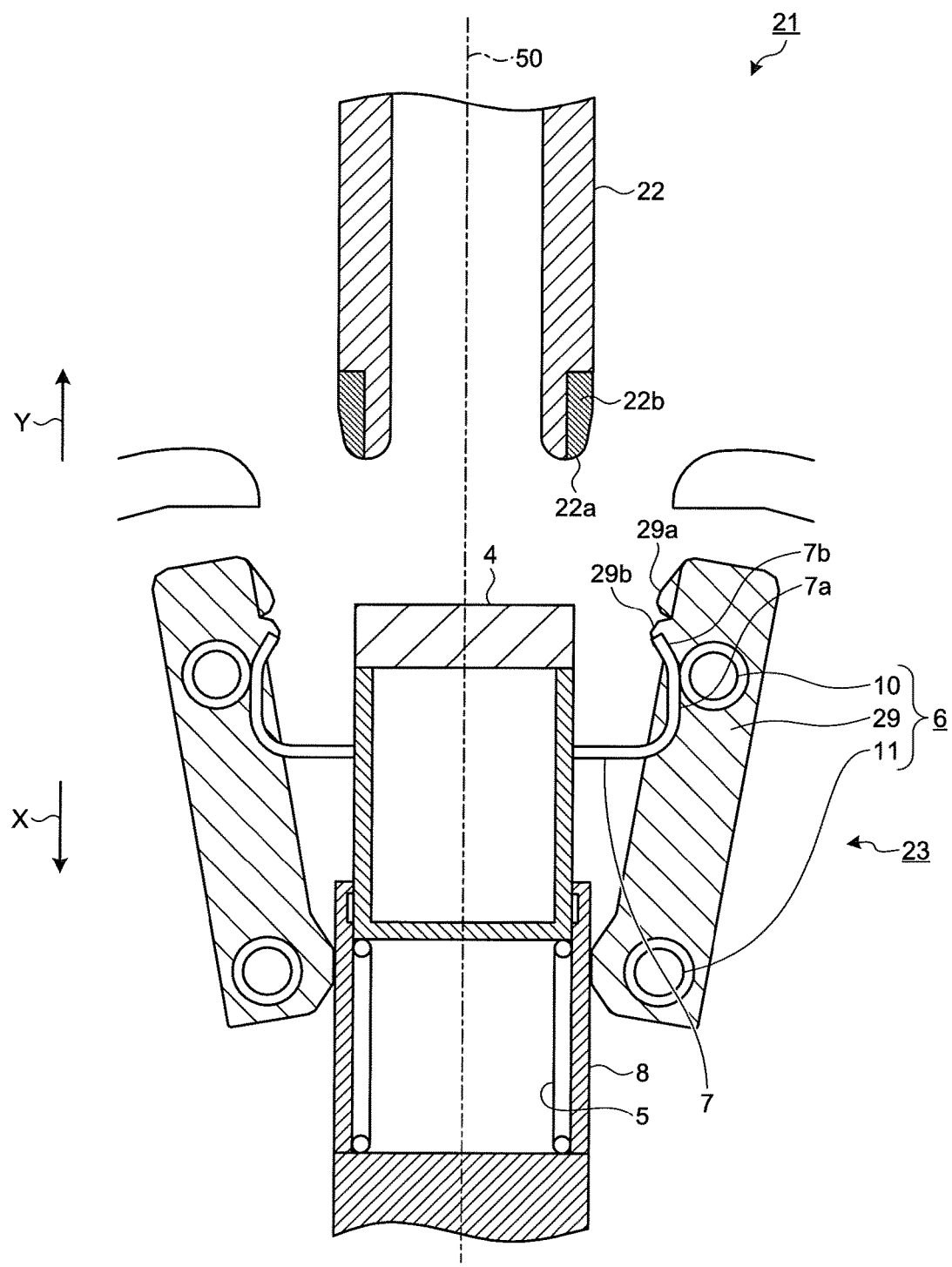
FIG. 9 is a sectional view illustrating a schematic configuration of a switchgear according to a second embodiment of the present invention.
Figure 10:
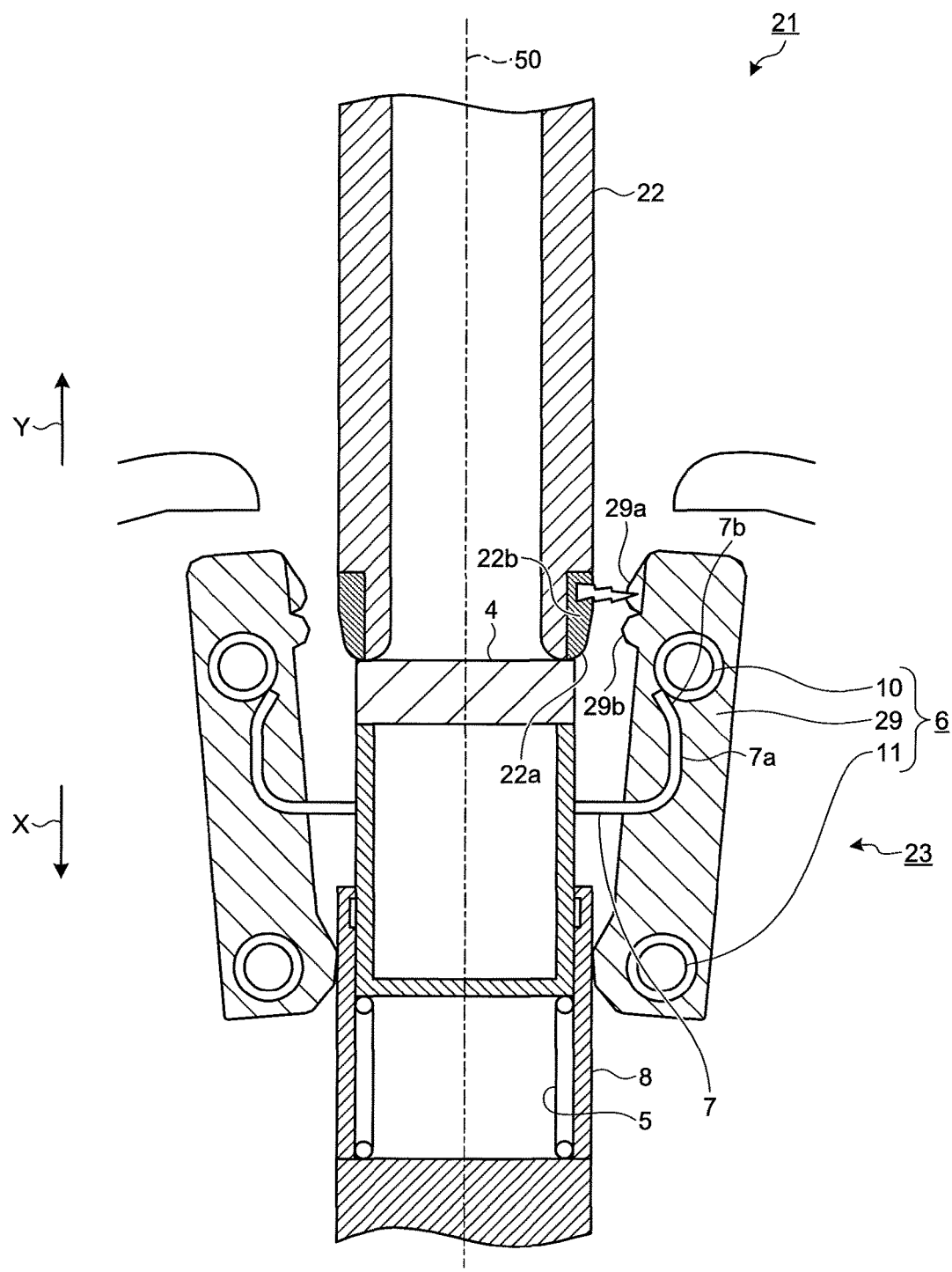
FIG. 10 is a sectional view for explaining a grounding operation of the switchgear according to the second embodiment.
Figure 11:
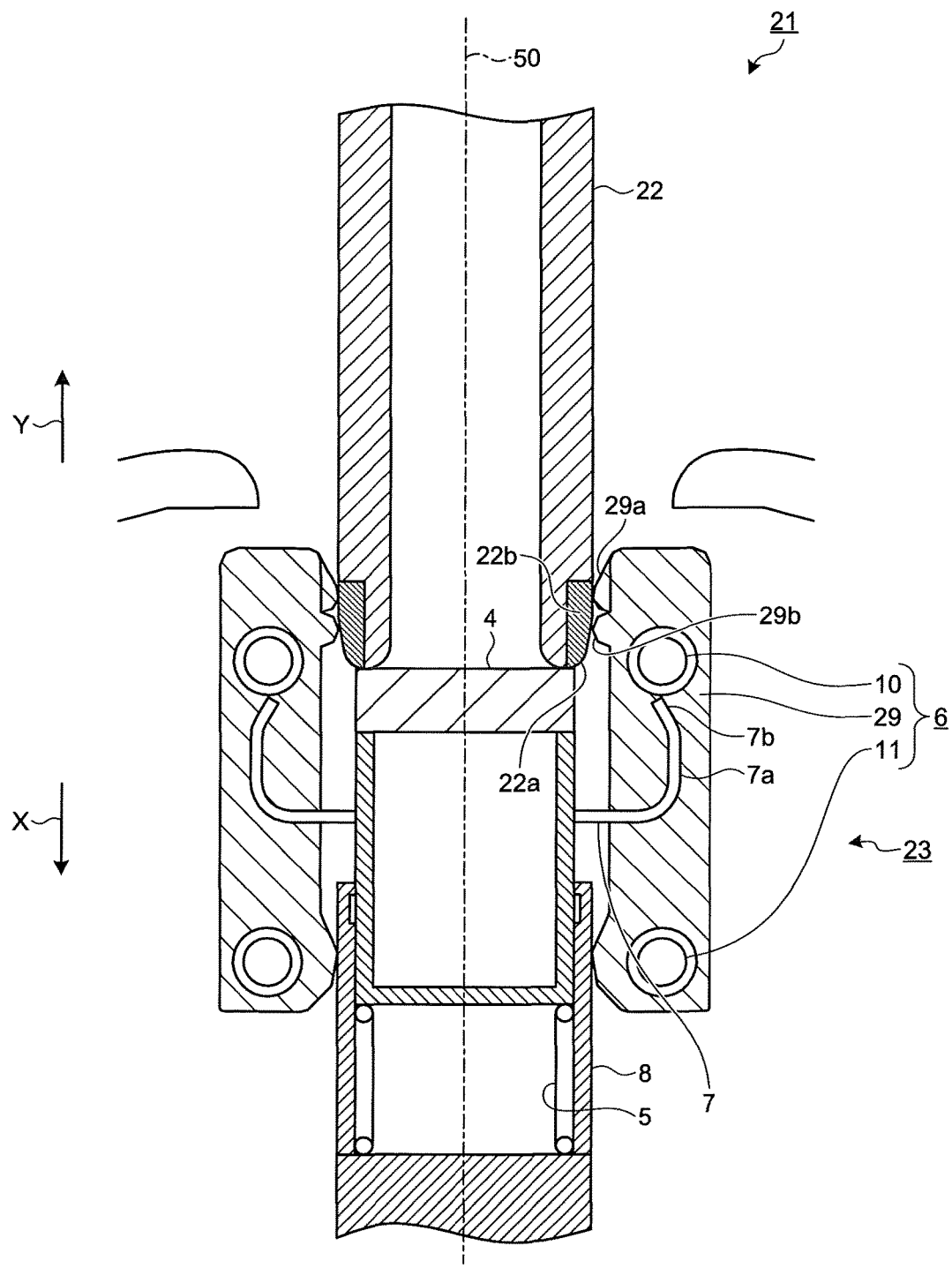
FIG. 11 is a sectional view for explaining a grounding operation of the switchgear according to the second embodiment.
Figure 12:
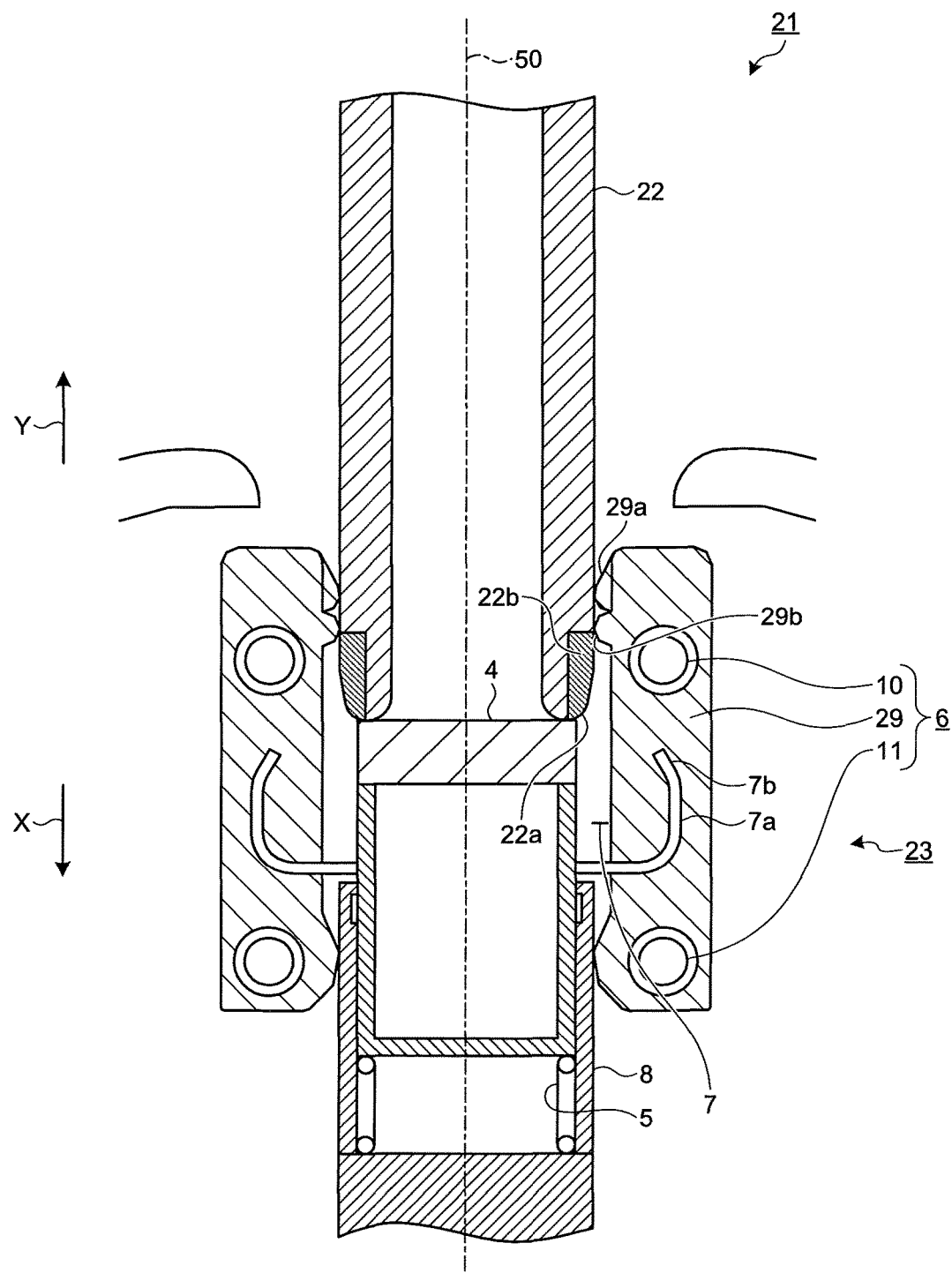
FIG. 12 is a sectional view for explaining a grounding operation of the switchgear according to the second embodiment.
Figure 13:
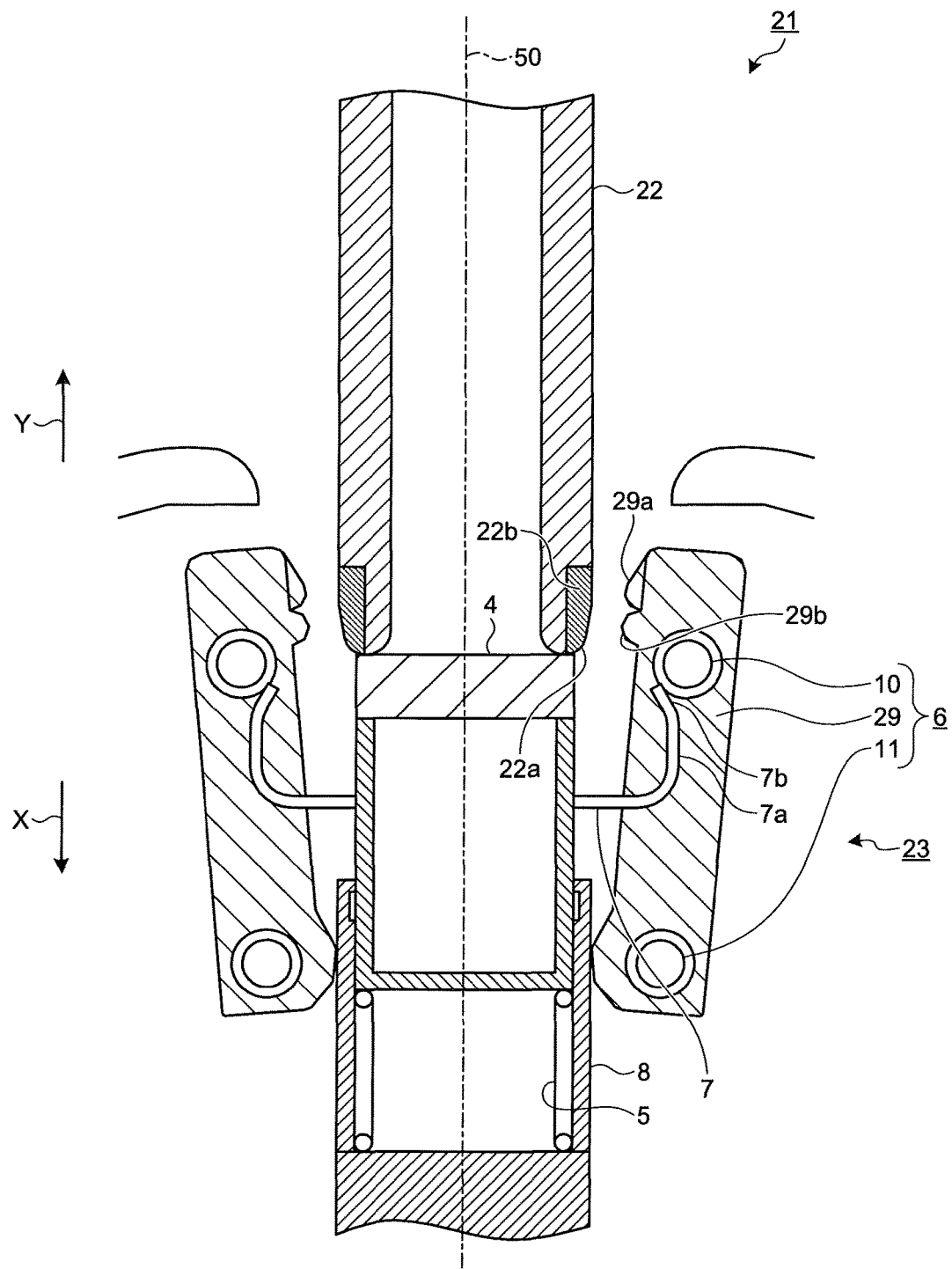
FIG. 13 is a sectional view for explaining a recovery operation of the switchgear according to the second embodiment.
Figure 14:
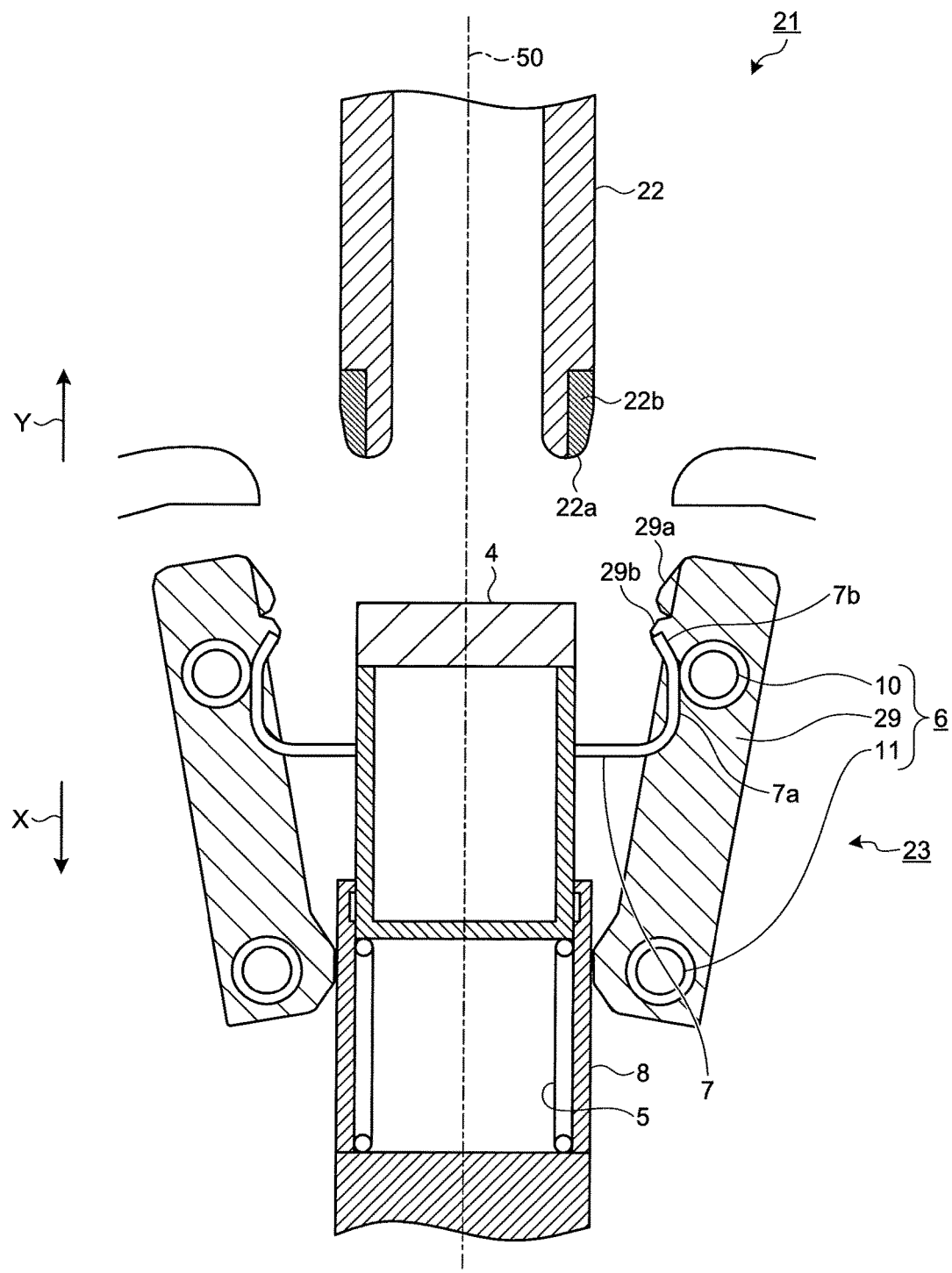
FIG. 14 is a sectional view for explaining a recovery operation of the switchgear according to the second embodiment.

FIG. 9 is a sectional view illustrating a schematic configuration of a switchgear 21 according to a second embodiment of the present invention. FIGS. 10 to 12 are sectional views for explaining a grounding operation of the switchgear 21 according to the second embodiment. FIGS. 13 and 14 are sectional views for explaining a recovery operation of the switchgear 21 according to the second embodiment. Elements identical to those of the first embodiment described above are denoted by like reference signs and detailed explanations thereof will be omitted.

For the switchgear 21 that is a grounding switchgear, an outer peripheral surface of a distal end part 22a of a movable contact 22 is an arc resistant part 22b that is made of an arc resistant material such as copper-tungsten alloy.

A first protrusion 29a and a second protrusion 29b protruding toward the motion axis 50 are formed on each of contact motion units 29 of the spaced unit 6. The first protrusion 29a is formed away from the second protrusion 29b in the direction indicated by the arrow Y. The first protrusion 29a is made of an arc resistant material.

Depending upon a value of the voltage applied to the bus, a switchgear that is a grounding switchgear may fail to sufficiently suppress occurrence of arc, despite contact between a movable contact and a stationary contact being established by the high-speed motion at the time of the erroneous closing operation. Even in such a case, the high-speed motion of the contact motion units brings the stationary contact into contact with the movable contact, thereby enabling the reduction in the arc occurrence time and thus achieving the simplification of the operating device and the coupling mechanism and the improvement of the reliability of the product.

For the switchgear 21 according to the second embodiment, the location where arc occurs during the erroneous closing operation is limited to the location between the arc resistant part 22b formed on the distal end part 22a of the movable contact 22 and the first protrusion 29a formed away from the second protrusion 29b in the direction indicated by the arrow Y, as illustrated in FIG. 10. Since the first protrusion 29a and the arc resistant part 22b are made of the arc resistant material, damages due to arc can be suppressed and the durability and reliability of the product can be improved.

After the arc is extinguished upon the abutment of the first protrusion 29a on the arc resistant part 22b, as illustrated in FIG. 11, the movable contact 22 is further moved in the direction indicated by the arrow X, whereby the silver-plated second protrusion 29b and a region of the movable contact 22 located away from the arc resistant part 22b in the direction indicated by the arrow Y, that is, the silver-plated region of the movable contact 22 abut on each other, as illustrated in FIG. 12, such that the bus is more reliably grounded.

Also in the second embodiment, the movable contact 22 may be the second contact and a stationary contact 23 may be the first contact.

Third Embodiment.

Figure 15:
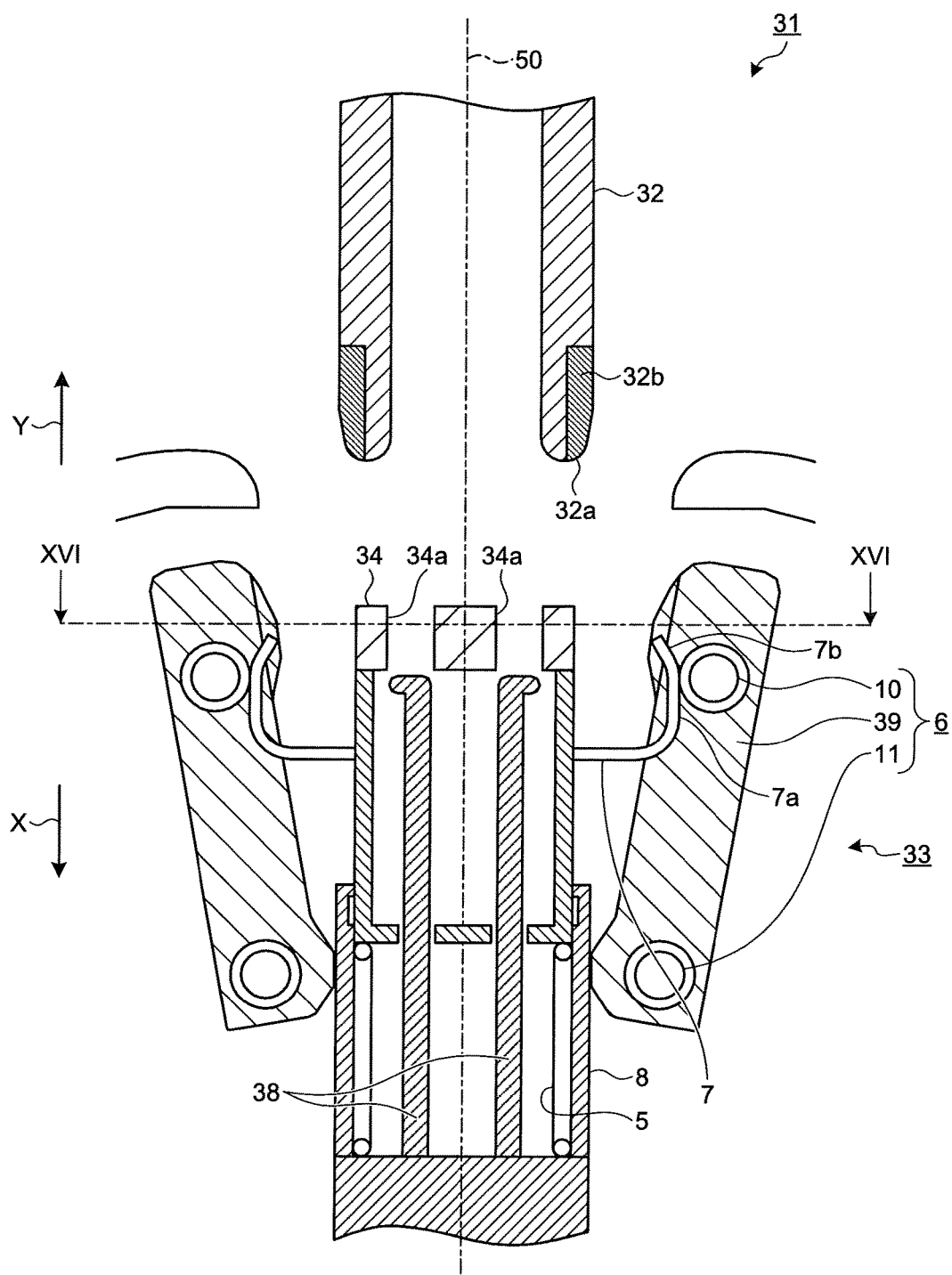
FIG. 15 is a sectional view illustrating a schematic configuration of a switchgear according to a third embodiment of the present invention.
Figure 16:
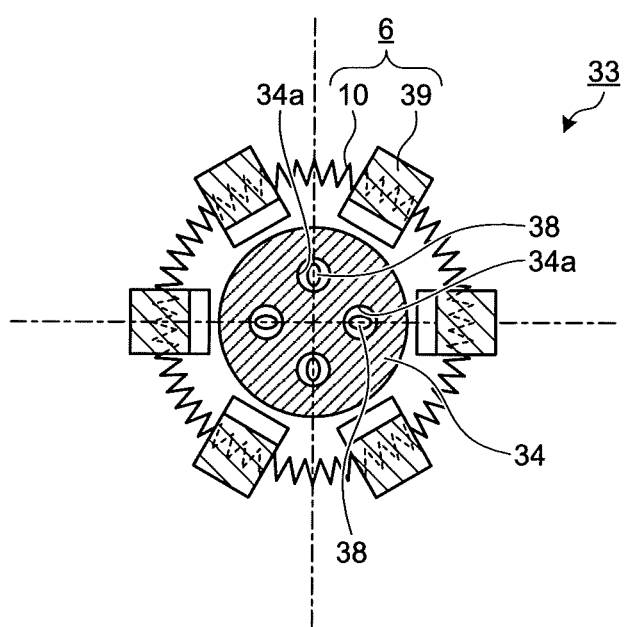
FIG. 16 is a sectional view as viewed in an arrow direction along a line XVI-XVI illustrated in FIG. 15.
Figure 17:
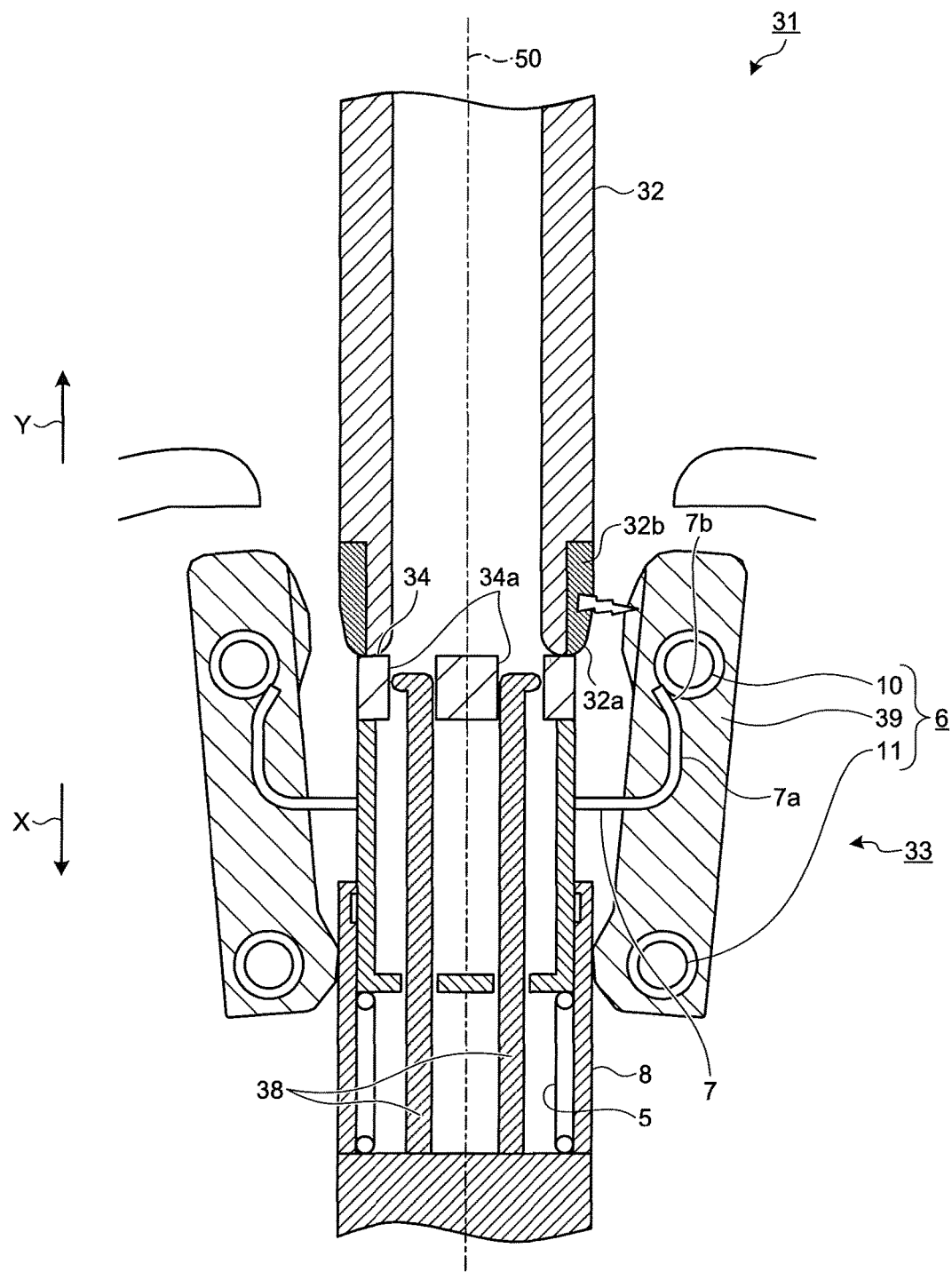
FIG. 17 is a sectional view for explaining a grounding operation of the switchgear according to the third embodiment.
Figure 18:
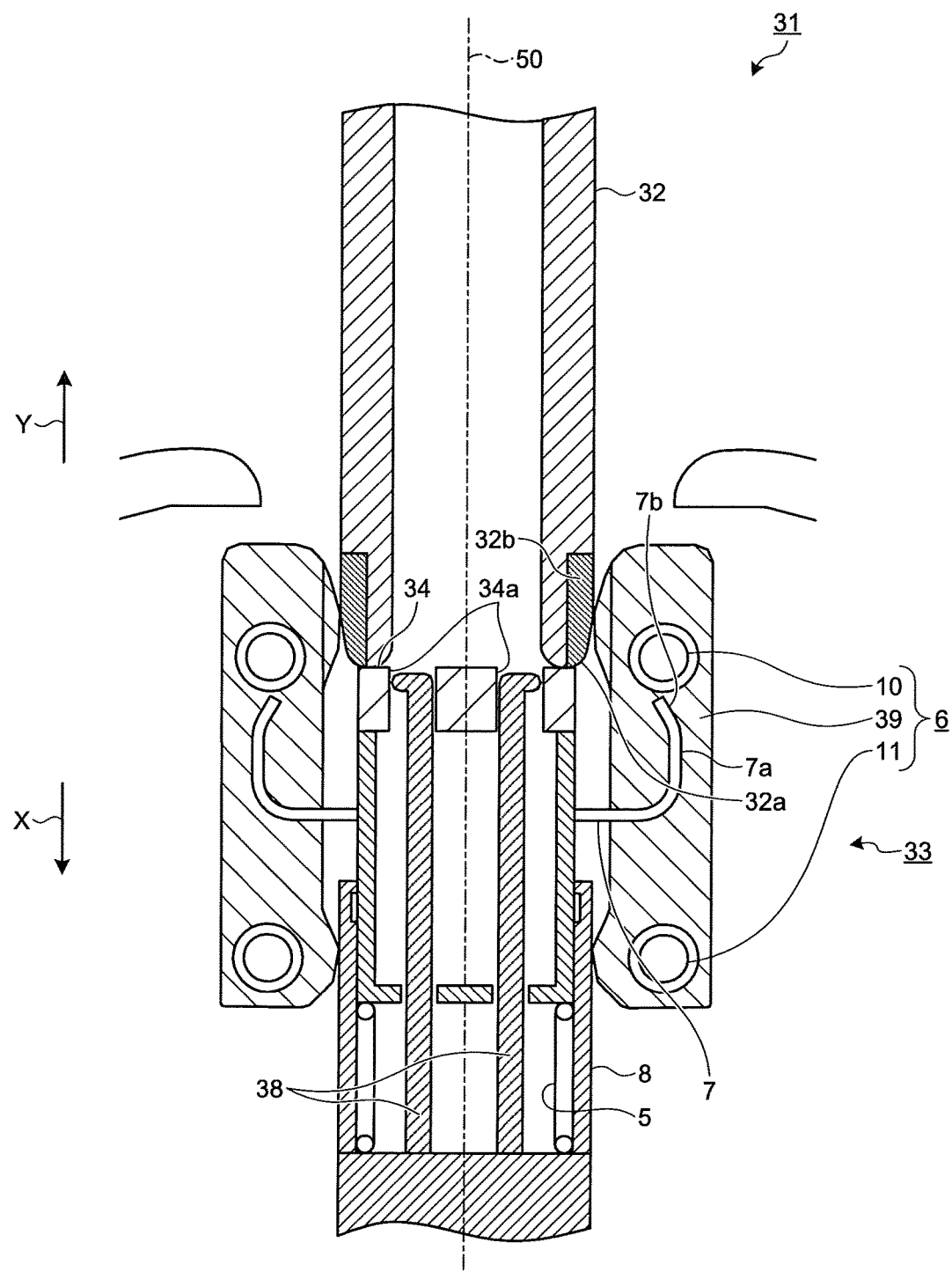
FIG. 18 is a sectional view for explaining a grounding operation of the switchgear according to the third embodiment.
Figure 19:
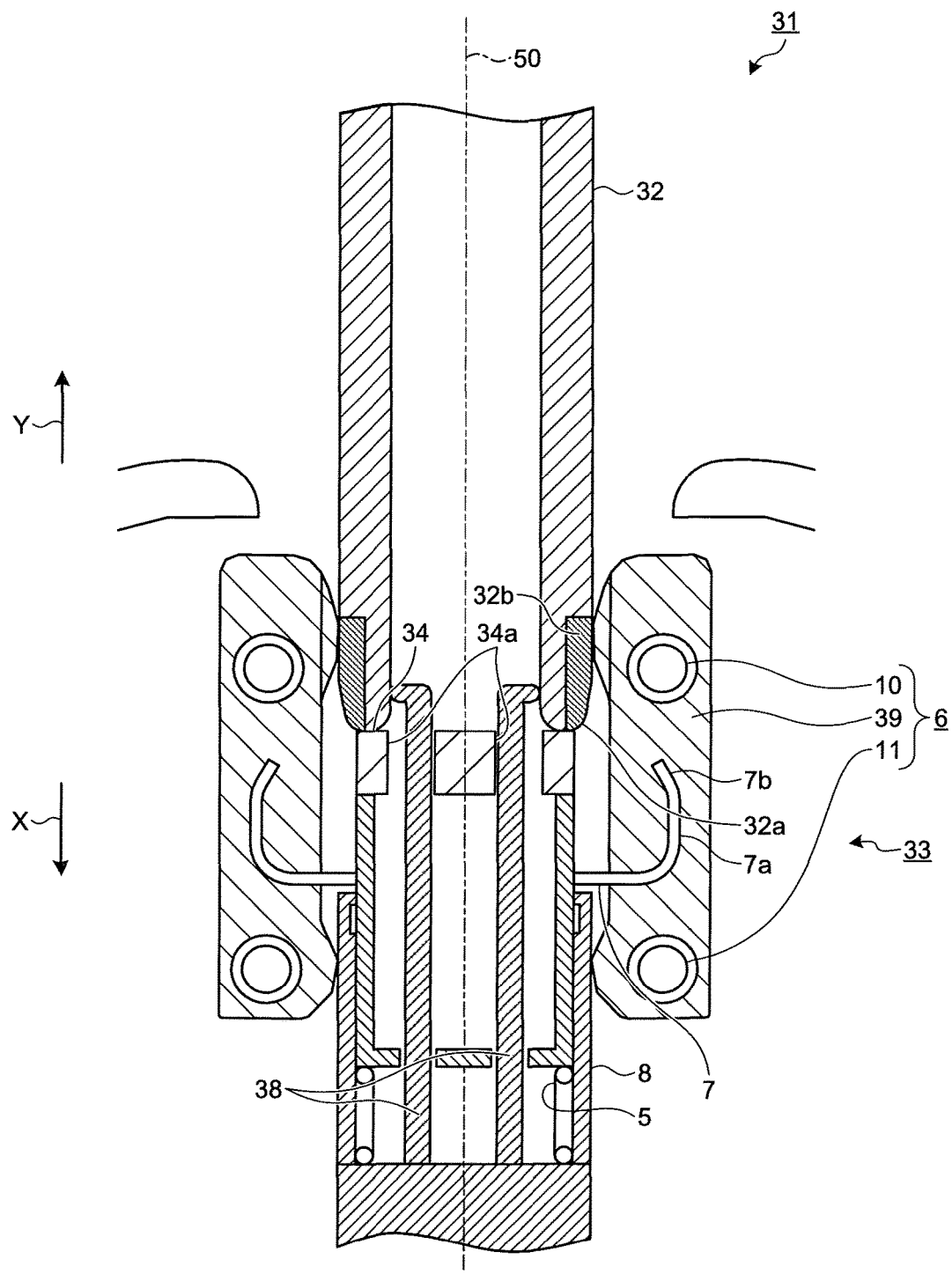
FIG. 19 is a sectional view for explaining a grounding operation of the switchgear according to the third embodiment.
Figure 20:
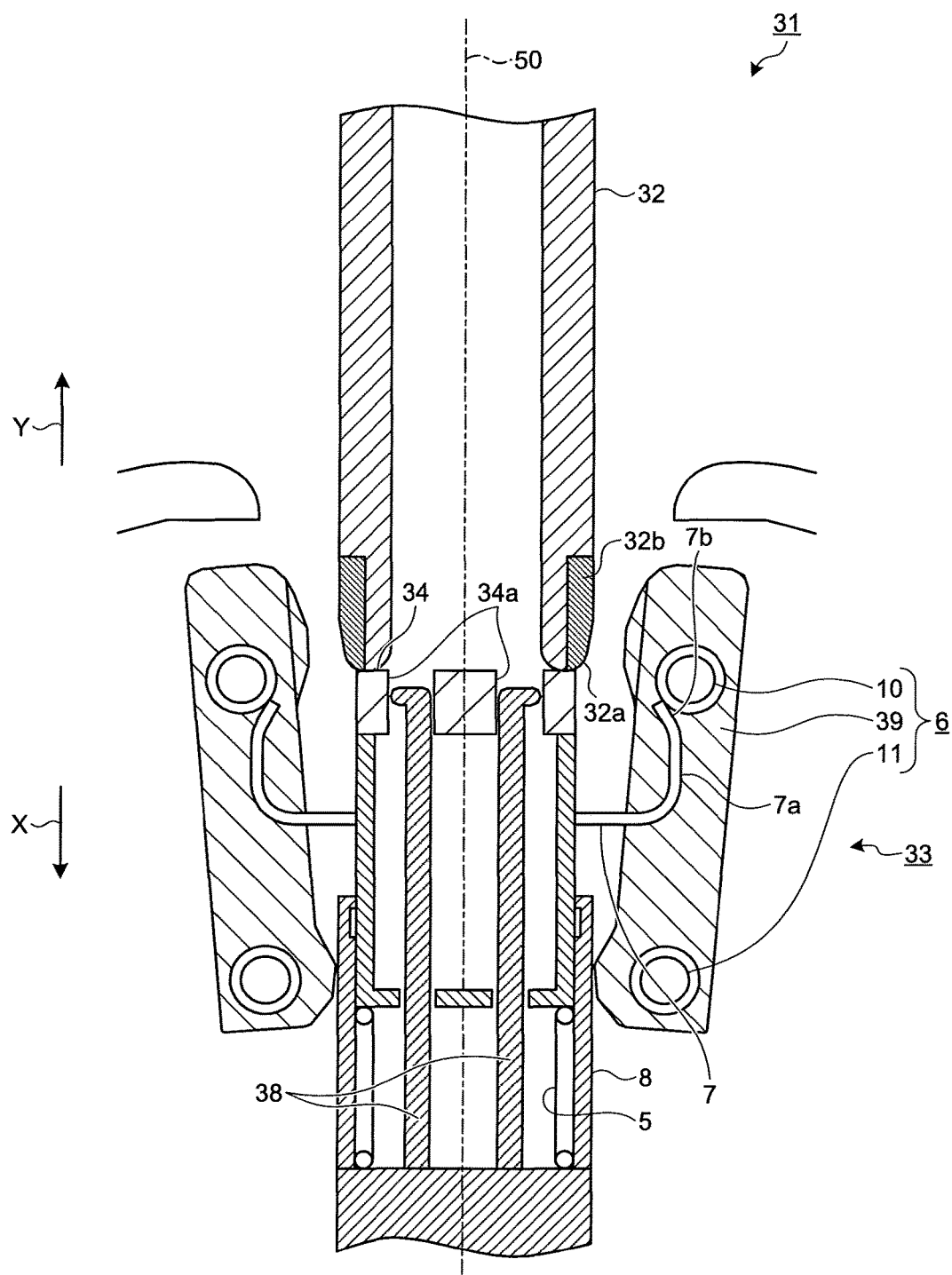
FIG. 20 is a sectional view for explaining a recovery operation of the switchgear according to the third embodiment.
Figure 21:
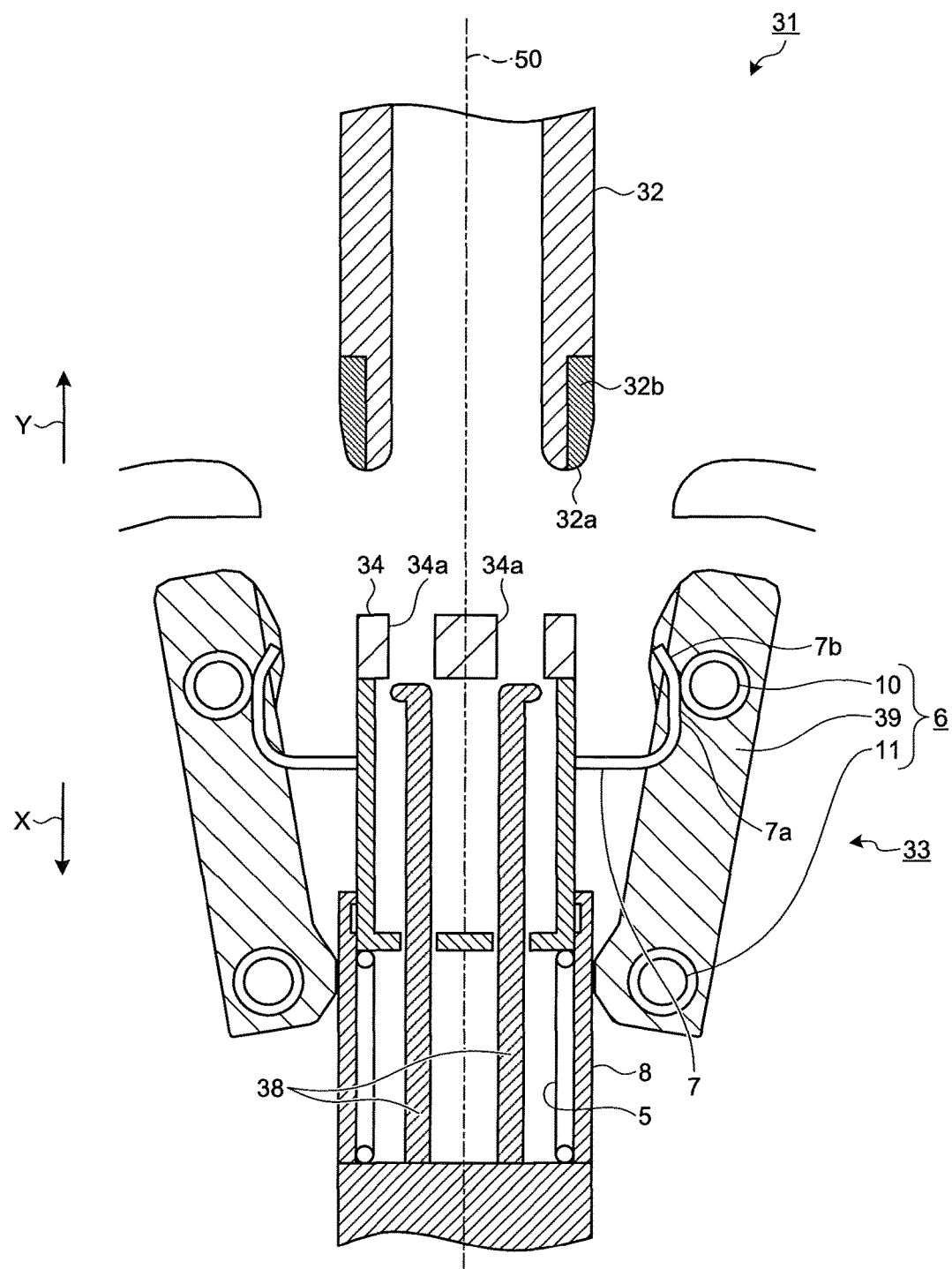
FIG. 21 is a sectional view for explaining a recovery operation of the switchgear according to the third embodiment.

FIG. 15 is a sectional view illustrating a schematic configuration of a switchgear 31 according to a third embodiment of the present invention. FIG. 16 is a sectional view taken along line XVI-XVI illustrated in FIG. 15. FIGS. 17 to 19 are sectional views for explaining a grounding operation of the switchgear 31 according to the third embodiment. FIGS. 20 and 21 are sectional views for explaining a recovery operation of the switchgear 31 according to the third embodiment. Elements identical to those of the first embodiment described above are denoted by like reference signs and detailed explanations thereof will be omitted.

For the switchgear 31 that is a grounding switchgear, an outer peripheral surface of a distal end part 32a of a movable contact 32 is an arc resistant part 32b that is made of an arc resistant material such as copper-tungsten alloy. A plurality of through holes 34a is formed through a facing unit 34 of a stationary contact 33 in parallel to the motion axis 50.

As illustrated in FIGS. 15 and 16, the stationary contact 33 includes main contact units 38 located on an inner side of the through holes 34a as viewed along the motion axis 50. When the facing unit 34 is located in the direction indicated by the arrow Y, the main contact units 38 are located away from the facing unit 34 in the direction indicated by the arrow X. During movement of the facing unit 34 in the direction indicated by the arrow X, the main contact units 38 pass through the through holes 34a, such that the main contact units 38 are exposed in the direction indicated by the arrow Y beyond the facing unit 34, as illustrated in FIGS. 18 and 19. The main contact units 38 exposed in the direction indicated by the arrow Y beyond the facing unit 34 abut on an inner wall of the movable contact 32.

Contact motion units 39 of the stationary contact 33 have parts that are to abut on the movable contact 32, and such parts are made of arc resistant materials.

For the switchgear 31 according to the third embodiment, the location where arc occurs during the erroneous closing operation can be limited to the location between the arc resistant part 32b formed on the distal end part 32a of the movable contact 32 and the arc-resistant-material-made part of the contact motion unit 39, as illustrated in FIG. 17. Since arc occurs at the part made of the arc resistant material, damages due to arc can be suppressed and thus the durability and reliability of the product can be improved.

Furthermore, as illustrated in FIG. 19, the bus can be grounded by bringing the main contact units 38 into contact with the movable contact 32 without making contact at the silver-plated parts between the movable contact 32 and the contact motion units 39. Accordingly, the resistance with respect to arc can be improved while the contact motion units 39 are simplified, and thus the production cost can be reduced.

For the configurations described in the above first and second embodiments, the silver-plated part that is to ultimately contact the movable contact 2 or 22 is formed on the contact motion units 9 or 29 that undergo the high-speed motion. As a result, the distance between the silver-plated parts during the grounding operation may be difficult to strictly control. In contrast, in the third embodiment, the silver-plated parts on the side of the stationary contact 33 that are to ultimately contact the movable contact 32 are located on the main contact units 38 that remain stationary during the grounding operation. As a result, the distance between the silver-plated parts can be controlled more correctly and thus occurrence of arc at the silver-plated parts can be prevented more reliably.

Also in the third embodiment, the movable contact 32 may be the second contact and the stationary contact 33 may be the first contact.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1 switchgear (grounding switchgear), 2 movable contact (first contact), 2a end part, 3 stationary contact (second contact), 4 facing unit, 5 first urging unit, 6 spaced unit, 7 regulating unit, 7a abutting face, 7b approaching face, 8 guide unit, 9 contact motion unit, second urging unit, 11 fixing unit, 21 switchgear (grounding switchgear), 22 movable contact, 22a end part, 22b arc resistant part, 23 stationary contact, 29 contact motion unit, 29a first protrusion, 29b second protrusion, 31 switchgear (grounding switchgear), 32 movable contact, 32a end part, 32b arc resistant part, 33 stationary contact, 34 facing unit, 34a through hole, 38 main contact unit, 39 contact motion unit, 50 motion axis.

The invention claimed is:

1. A switchgear comprising a first contact disposed to be capable of reciprocating along a motion axis, and a second contact disposed on the motion axis, wherein
   the second contact includes
   a facing unit made of an insulating material and facing a distal end part of the first contact, the distal end part being located in a first direction, the first direction being a direction from the first contact toward the second contact, the facing unit being disposed to be movable in the first direction when the facing unit is pushed in by the distal end part of the first contact moving in the first direction, an urging unit to urge the facing unit in a second direction, the second direction being a direction opposite to the first direction, a spaced unit spaced from the motion axis and urged in a direction toward the motion axis, and a regulating unit coupled to the facing unit, the spaced unit abuts on the regulating unit to regulate movement of the spaced unit in the direction toward the motion axis as the facing unit is located in the second direction under action of an urging force of the urging unit, the spaced unit is released from abutment on the regulating unit to remove the regulation of the movement of the spaced unit in the direction toward the motion axis as the facing unit is pushed in by the distal end part of the first contact to move in the first direction, and the spaced unit is disposed without abutting on the first contact that reciprocates, as the regulating unit regulates the movement of the spaced unit in the direction toward the motion axis, and the spaced unit moves in the direction toward the motion axis into abutment on the first contact as the regulation by the regulating unit is removed.

2. The switchgear according to claim 1, wherein the regulating unit includes an abutment face to abut on the spaced unit from a side of the motion axis, the abutment face approaches the motion axis as the abutment face extends in the second direction, and the abutment face moves the spaced unit in a direction away from the motion axis when the regulating unit moves in the second direction.

3. The switchgear according to claim 1, wherein the spaced unit has a first protrusion and a second protrusion formed thereon, the first and second protrusions protruding toward the motion axis, the first protrusion is formed away from the second protrusion in the second direction and is made of an arc resistant material, and the distal end part of the first contact is made of an arc resistant material.

4. The switchgear according to claim 1, wherein the first contact has a tubular shape having a center axis defined by the motion axis, the facing unit has a through hole formed therethough in parallel to the motion axis, the second contact includes a main contact unit located on an inner side of the through hole as the second contact is viewed along the motion axis, and the main contact unit is located away from the facing unit in the first direction as the facing unit is located in the second direction, and the main contact unit passes through the through hole to be exposed in the second direction beyond the facing unit and abuts on an inner wall of the first contact as the facing unit moves in the first direction.

\* \* \* \* \*